(12) United States Patent
Vogel

(10) Patent No.: US 8,959,382 B2
(45) Date of Patent: Feb. 17, 2015

(54) CONTROLLING COMMUNICATION OF A CLOCK SIGNAL TO A PERIPHERAL

(75) Inventor: Gabriel Vogel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 467 days.

(21) Appl. No.: 13/340,781

(22) Filed: Dec. 30, 2011

(65) Prior Publication Data

US 2013/0173951 A1    Jul. 4, 2013

(51) Int. Cl.
*G06F 1/04* (2006.01)
*G06F 13/24* (2006.01)

(52) U.S. Cl.
USPC ............. 713/600; 713/601; 710/39; 710/267

(58) Field of Classification Search
USPC ............................ 713/600, 601; 710/39, 267
See application file for complete search history.

(56) References Cited

U.S. PATENT DOCUMENTS

2010/0229011 A1*   9/2010   Pedersen et al. ............. 713/322

\* cited by examiner

*Primary Examiner* — Michael J Brown
(74) *Attorney, Agent, or Firm* — Trop, Pruner & Hu, P.C.

(57) ABSTRACT

A method of communicating in an electronic system or apparatus is disclosed. The method includes using a processor to communicate with a peripheral. The method further includes using the peripheral to request a clock signal. The method also includes selectively control communication of the clock signal to the peripheral in response to the request.

20 Claims, 6 Drawing Sheets

CONTROLLING COMMUNICATION OF A CLOCK SIGNAL TO A PERIPHERAL

BACKGROUND

An electronics device may include an embedded microcontroller unit (MCU) for a number of different applications. The MCU may include a processor core that, for example, processes incoming and outgoing streams of data for the electronic device. In a mobile telecommunications device, for example, the processor core may process data that is communicated over a wireless network.

For purposes of communicating with its peripherals, processing data and so forth, the processor core may operate in an active mode in which the processor core consumes a relatively large amount of power. For purposes of conserving power when the processor core is relatively inactive, the processor core may transition into a lower power consumption state.

SUMMARY

In an exemplary embodiment, a technique includes using a processor to communicate with a peripheral; using the peripheral to request a clock signal; and selectively controlling communication of the clock signal to the peripheral in response to the request.

In another exemplary embodiment, an apparatus includes a processor, a peripheral to communicate with the processor and a controller. The peripheral is adapted to request a clock signal, and the controller is adapted to selectively control communication of the clock signal to the peripheral in response to the request.

In yet another exemplary embodiment, an apparatus includes an integrated circuit, which includes a processor, a peripheral to communicate with the processor and a controller. The peripheral is adapted to request a clock signal, and the controller is adapted to selectively control communication of the clock signal to the peripheral in response to the request.

Advantages and other desired features will become apparent from the following drawing, description and claims.

DETAILED DESCRIPTION

Figure 1:
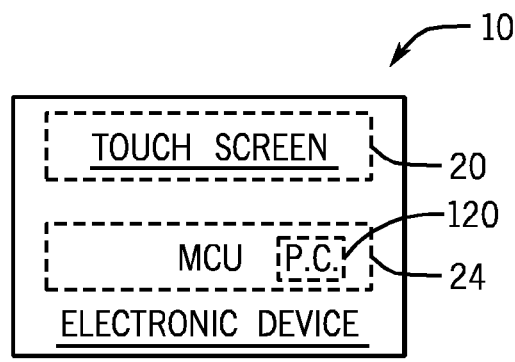
FIG. 1 is a schematic diagram of an electronic device according to an exemplary embodiment.

Referring to FIG. 1, in accordance with embodiments disclosed herein, an embedded microcontroller unit (MCU) 24 may be used in a variety of applications, such as applications in which the MCU 24 controls various aspects of an electronic device 10. As non-limiting examples, the electronic device 10 may be a smartphone, a cellular telephone, a portable digital assistant (PDA), a portable or notebook computer, a client computer, and so forth, depending on the particular embodiment. The MCU 24 may be part of an integrated circuit (IC), or semiconductor package, and as such, may include a processor core as well as various peripherals that communicate with the processor core for purposes of operating the electronic device 10. Among its many functions, the MCU 24 may be used for purposes of sensing user input on a touchscreen 20 of the electronic device 10. Moreover, the MCU 24 may process data generated in response to the received touchscreen input and generate corresponding images to be displayed on the touchscreen 20. The MCU 24 may perform various other and different functions, depending on the particular embodiment, such as functions related to receiving and processing wireless data; receiving and processing cellular voice and data channels; receiving and processing data communicated over a serial bus; receiving, processing and transmitting data communicated over a Bluetooth® communication link; and so forth.

For purposes of conserving power, the MCU 24 may implement various power conservation measures. For example, in accordance with some embodiments, a processor core 120 of the MCU 24 may transition between different power consumption states. For example, the processor core 120 may operate in an idle mode, which is associated with a relatively low power consumption when the processor core 120 is not processing data. In the idle mode, the processor core 120 may not receive a clock signal, in accordance with some embodiments.

In addition to the processor core 102, the MCU 24 contains peripheral devices (called "peripherals" herein) to the processor core 120. When a peripheral of the MCU 24 has data to be processed by the processor core 120, the MCU 24 may transition the processor core 120 to an active mode, which is associated with a relatively higher power consumption. In the active mode, the processor core 120 receives a clock signal, which allows the processor 120 to communicate with one or more of the peripherals to therefore process the data. When no more data is to be processed, the MCU 24 may then transition the processor core 120 returns to the idle state.

As disclosed herein, in general, the peripherals have active modes in which the peripherals process and communicate data as well as idle modes in which the peripherals enter reduced power consumption states when the peripherals are not processing or communicating data. The clock signal to a peripheral may be removed from a peripheral during the peripheral's idle mode and provided to the peripheral during the peripheral's active mode. The removal of the clock signal during the peripheral's idle mode enhances the power efficiency of the peripheral, as the peripheral's inactive digital components are not being clocked.

Figure 2:
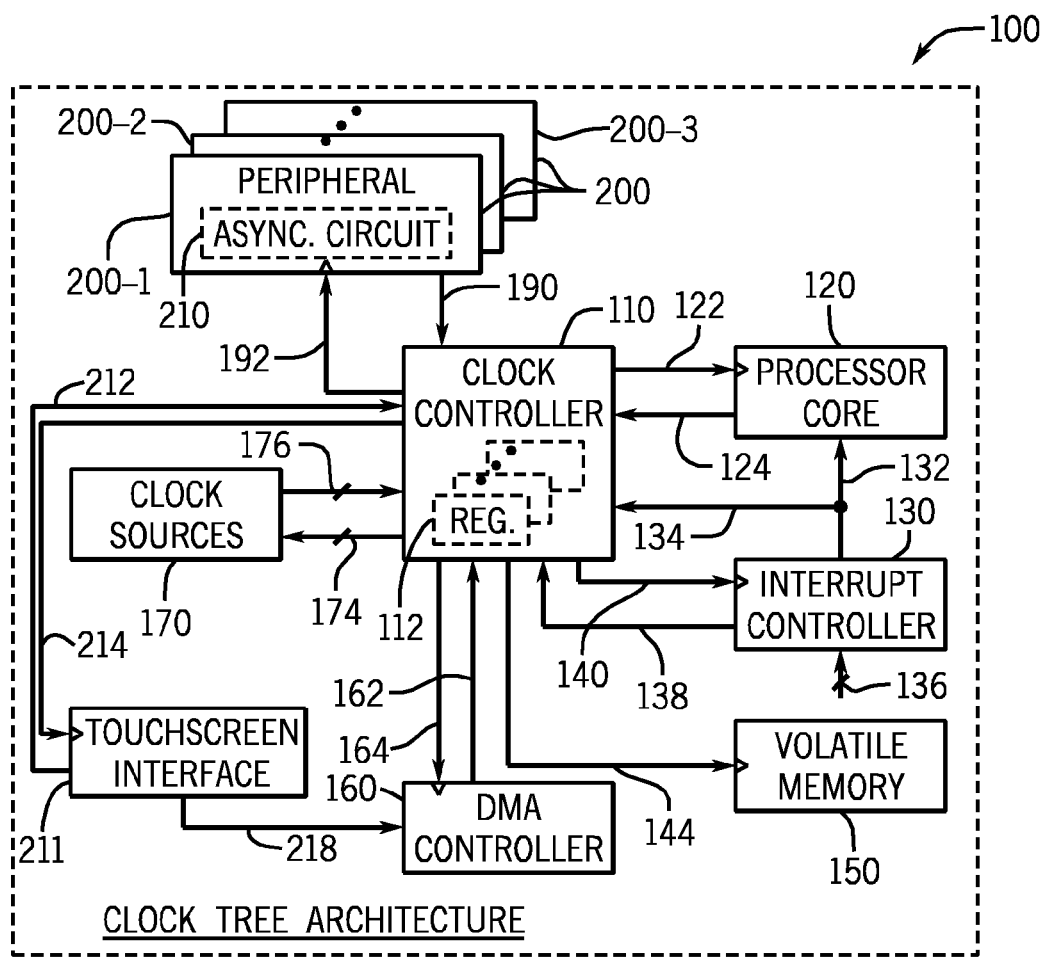
FIG. 2 is a schematic diagram of a clock tree architecture of a microcontroller unit of the electronic device of FIG. 1 according to an exemplary embodiment.

More specifically, systems and techniques are disclosed herein for purposes of regulating the communication of the clock signals to the peripherals and the processor core 120 of the MCU 24. In this manner, FIG. 2 depicts an exemplary clock tree architecture 100 for the MCU 24, in accordance with some embodiments. As described herein, for certain configurations of the clock tree architecture 100, a peripheral of the MCU 24 may request a clock signal when the peripheral wakes up from an idle mode; and thereafter, the peripheral may cancel the request to remove the clock signal from the peripheral when the peripheral transitions to the idle mode.

The clock tree architecture 100 of FIG. 2 illustrates various peripherals, such as a touchscreen interface 211, a direct memory access (DMA) controller 160, a volatile memory (dynamic random access memory (DRAM), for example) 150 and an interrupt controller 103. The clock tree architecture 100 further generally illustrates other peripherals 200 (three exemplary peripherals 200-1, 200-2 and 200-3 being depicted in FIG. 2, as non-limiting examples) of the MCU 24. The peripherals 200 may include such peripherals as a programmable clock array, analog peripherals, communication peripherals, timers, power management unit, bus interfaces, and so forth.

For purposes of regulating delivery of the clock signals to the peripherals and the processor core 120, the MCU 24 includes a clock controller 110. In general, the clock controller 110 may receive a request for a clock signal from a given peripheral so that, if the configuration for the peripheral permits, the clock controller 110 may, in response to the request, furnish the clock signal to the requesting peripheral. Correspondingly, the clock controller 110 causes the clock signal to a given peripheral to be removed when the peripheral removes, or cancels its clock request.

As depicted in FIG. 2, the clock controller 110 also furnishes a clock signal to a clock input terminal 122 of the processor core 120 when the processor core 120 is in the active mode. The processor core 120 may communicate with the clock controller 110 via a communication line 124 for purposes of informing the clock controller 110 whether the processor core 120 is in the active mode or in the idle mode. In this manner, in general, when the processor core 120 informs the clock controller 110 that the processor core 120 is in the idle mode (via the communication line 124), the clock controller 110 removes the clock signal from to the clock input terminal 122.

When in the idle mode, an event may occur to "wake up" the processor core 120 to transition the processor core 120 to the active mode. For example, an interrupt controller 130 of the MCU 24 may receive an interrupt request on one of its input terminals 136 from one of the peripherals and as a result, may generate an interrupt request, which propagates to an interrupt request input terminal 134 of the clock controller 110 and an interrupt request terminal 132 of the processor core 120. For example, a given peripheral may generate an interrupt request that is received by the interrupt controller 130 in response to the peripheral receiving data or otherwise requesting the processor core 120 to transition from the idle mode to the active mode for purposes of communicating with the processor core 120.

More specifically, in accordance with some embodiments, upon receiving the interrupt request, the interrupt controller 130 (using asynchronous circuitry, as further described below) may first request a clock signal for the interrupt controller 130 by asserting a clock request via clock request line 138 and, thereafter, the clock controller 110 may furnish the corresponding clock signal to a clock input terminal 140 of the interrupt controller 130. The interrupt controller 130 may then process the interrupt request from the peripheral and generate an interrupt that is communicated to the interrupt input terminals 132 and 134. In response to receiving the interrupt request from the interrupt controller 130, the clock controller 110 provides a clock signal to the clock input terminal 122 of the processor core 120. In this manner, the processor core 120, using this clock signal, may thereafter process the interrupt request received at its interrupt request input terminal 132.

The interrupt controller 130 is an example of one of the peripherals of the MCU 24, which includes an asynchronous circuit 210 that controls the generation and cancellation of clock requests. The asynchronous circuit 210 for a given peripheral does not operate in response to the peripheral's clock signal and as such, operates independently of the synchronous, or digital clocked components of the peripheral. In general, the asynchronous circuit 210 generates a clock signal request when the peripheral transitions to and is in an active mode and correspondingly removes, or cancels, the clock signal request when the peripheral transitions to and is in the idle mode.

More specifically, using the peripheral 200-1 depicted in FIG. 2 as a non-limiting example, the peripheral 200-1 includes the asynchronous circuit 210, which communicates with the clock controller 110 via an associated clock request line 190 for purposes of communicating a clock request to the clock controller 110 when the peripheral 200-1 is in or is transitioning top the active mode. In accordance with some embodiments, in response to a clock request, the clock controller 110 furnishes a clock signal to the peripheral 200-1 via the peripheral's clock input terminal 192. When the peripheral 200-1 transitions to its idle mode, the asynchronous circuit 210 removes the clock request, and the clock controller 110, in response thereto, removes the clock signal provided to the clock input terminal 192 of the peripheral 200-1.

As a more specific example of a peripheral requesting and canceling its clock request, the touchscreen interface 211 has an input clock terminal 214 and a clock request line 212, which is used to communicate a clock request from the touchscreen interface 211 to the clock controller 110. The touchscreen interface 211 also includes an asynchronous circuit (not shown) for purposes of generating clock requests on the clock request line 212.

In accordance with some embodiments, the touchscreen interface 211 monitors the touchscreen 20 (see FIG. 1) of the electronic device 10 for purposes of detecting and responding to user input. In this manner, the touchscreen interface 211 may enter an idle mode, which causes the asynchronous circuit of the touchscreen interface 211 to remove its clock request to correspondingly cause the clock controller 110 to remove the clock signal from the input clock terminal 214. When in the idle mode, the asynchronous circuit of the touchscreen interface 211 monitors the touchscreen 20 for a user input (input due to a user's finger touching the touchscreen 20, for example); and upon detecting user input, the asynchronous circuit of the touchscreen interface 211 submits a clock request to the clock controller 110, which responds (for this example) by providing a clock signal to the clock input terminal 214. The digital components of the touchscreen interface 211 respond to the clock signal to process the user input and correspondingly communicate with a direct memory access (DMA) controller 160 for purposes of informing the DMA controller 160 of data to be transferred from the touchscreen interface 211.

The DMA controller 160 is an example of another peripheral that transitions between idle and active modes and requests its clock signal from the clock controller 110. If idle, an asynchronous circuit of DMA controller 160 responds to the DMA request from the touchscreen interface 211 by submitting a clock request to the clock controller 110 (via a corresponding clock request line 162); and the clock controller 110 responds to this clock request to provide a clock signal to a clock input terminal 164 of the DMA controller 160. In response to the clock signal, the DMA controller 160 transitions from idle mode to the active mode and the digital components of the DMA controller 160 then operate pursuant to this clock signal to perform various functions for the controller 160.

For example, the DMA controller 160 may generate an interrupt request, which is processed by the interrupt controller 130 for purposes of waking up the processor core 120 if the core 120 is idle so that the processor core 120 may set up a DMA transfer operation to transfer data from the touchscreen interface 211 by communicating with the DMA controller 160 via communication line 218. When the DMA controller 160 no longer has data to transfer, in accordance with some embodiments, the DMA controller 160 transitions into the idle mode and removes the clock request, which causes the clock controller 110 to correspondingly remove the clock signal to the DMA controller 160. Likewise, when the touchscreen interface 211 undergoes a certain period of inactivity, the touchscreen interface 211 transitions into the idle mode and removes its clock request, which causes the clock controller 110 to remove the clock signal from the touchscreen interface 211.

Among its other features, the clock tree architecture 100 includes various clock sources 170, which may include internal oscillators of the MCU 24, external oscillators to the MCU 24, crystal oscillators, resistor-capacitor (R-C) oscillators, and so forth, depending on the particular embodiment. In general, the clock controller 110 communicates a multiple bit clock request signal (via communication lines 174) to the clock sources 170 for purposes of selecting one or more clock signals, which are generated by the clock sources 170. The clock sources 170 provide the one or more requested clock signals to the clock controller 110 via communication lines 176.

In general, the clock controller 110 may operate in various modes and configurations, which may be programmed via one or more registers 112 of the clock controller 110. In this regard, depending on the embodiment, the processor core 120 may selectively program the bits of the register(s) 112 for purposes of selecting various modes and configurations for the clock controller 110, which are described herein.

As non-limiting examples, the clock controller 110 may be configured via the register(s) 112 to always provide clock signals to the peripherals of the MCU 24, regardless of whether the processor core 120 is in its active mode or in its idle mode. As another example, the clock controller 110 may be configured via the register(s) 112 to always provide clock signals to the peripherals of the MCU 24 when the processor core 120 is in its active mode and selectively provide the clock signals to the peripherals in response to requests from the peripherals when the processor core 120 is in its idle mode. As another example, the clock controller 110 may be configured by the register(s) 112 to always provide clock signals to the peripherals when the processor core 120 is in its idle mode and selectively provide clock signals to the peripherals in response to requests from the peripherals when the processor core 120 is in its active mode. Moreover, the clock controller 110 may be configured by the register(s) 112 to shut down the clock sources 170 when the processor core 120 is in its idle mode and none of the peripherals have requested clock signals. Thus, many variations are contemplated and are within the scope of the appended claims.

Figure 3:
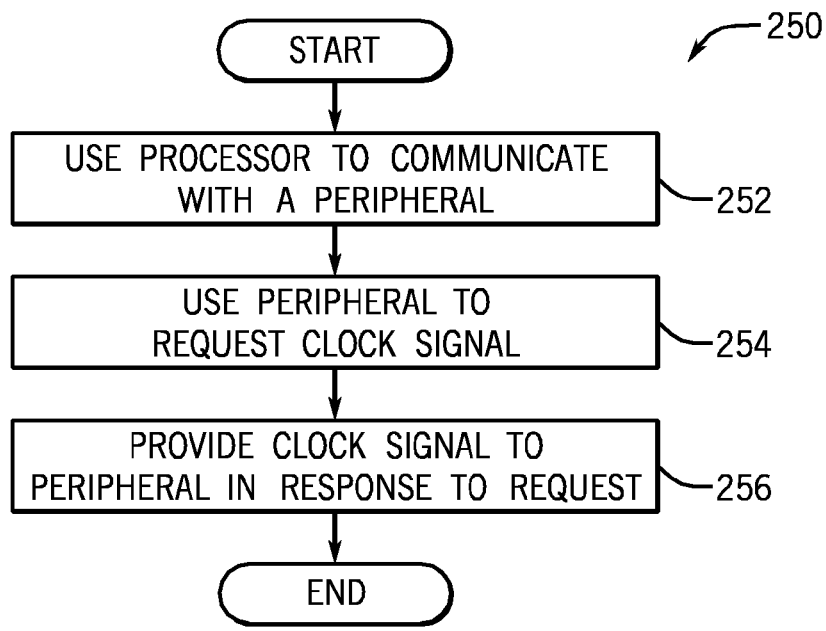
FIGS. 3, 4, 5 and 6 are flow diagrams depicting techniques to control communication of a clock signal to a peripheral according to exemplary embodiments.

Referring to FIG. 3, to generally summarize, a technique 250 in accordance with embodiments that are disclosed herein includes using (block 252) a processor to communicate with a peripheral and using (block 254) the peripheral to request a clock signal. The technique 250 includes selectively controlling communication of the clock signal to the peripheral in response to the request, pursuant to block 256.

Figure 4:
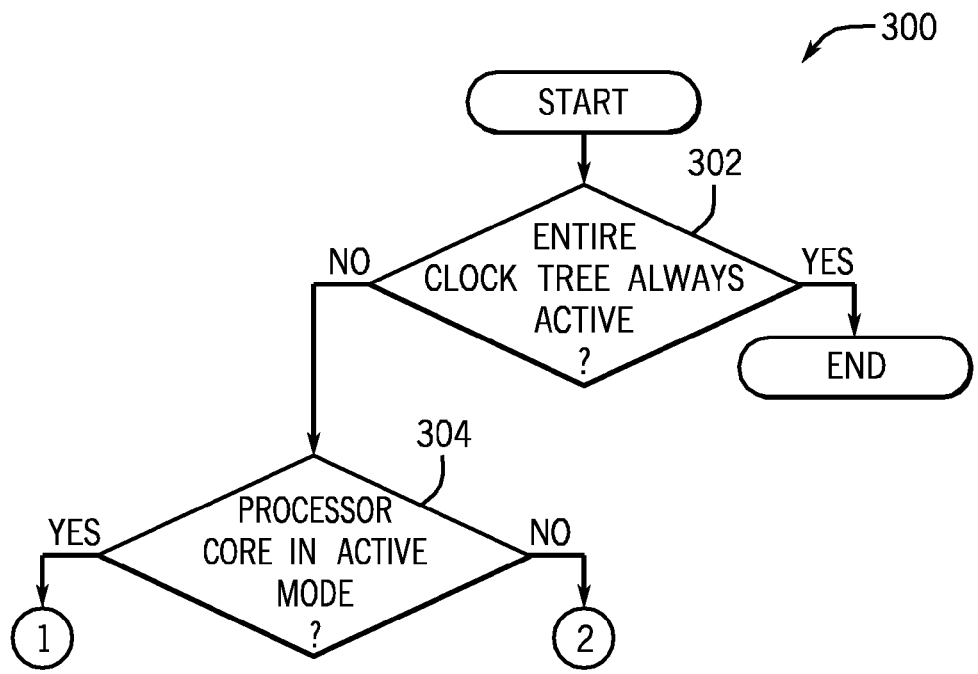
Figure 5:
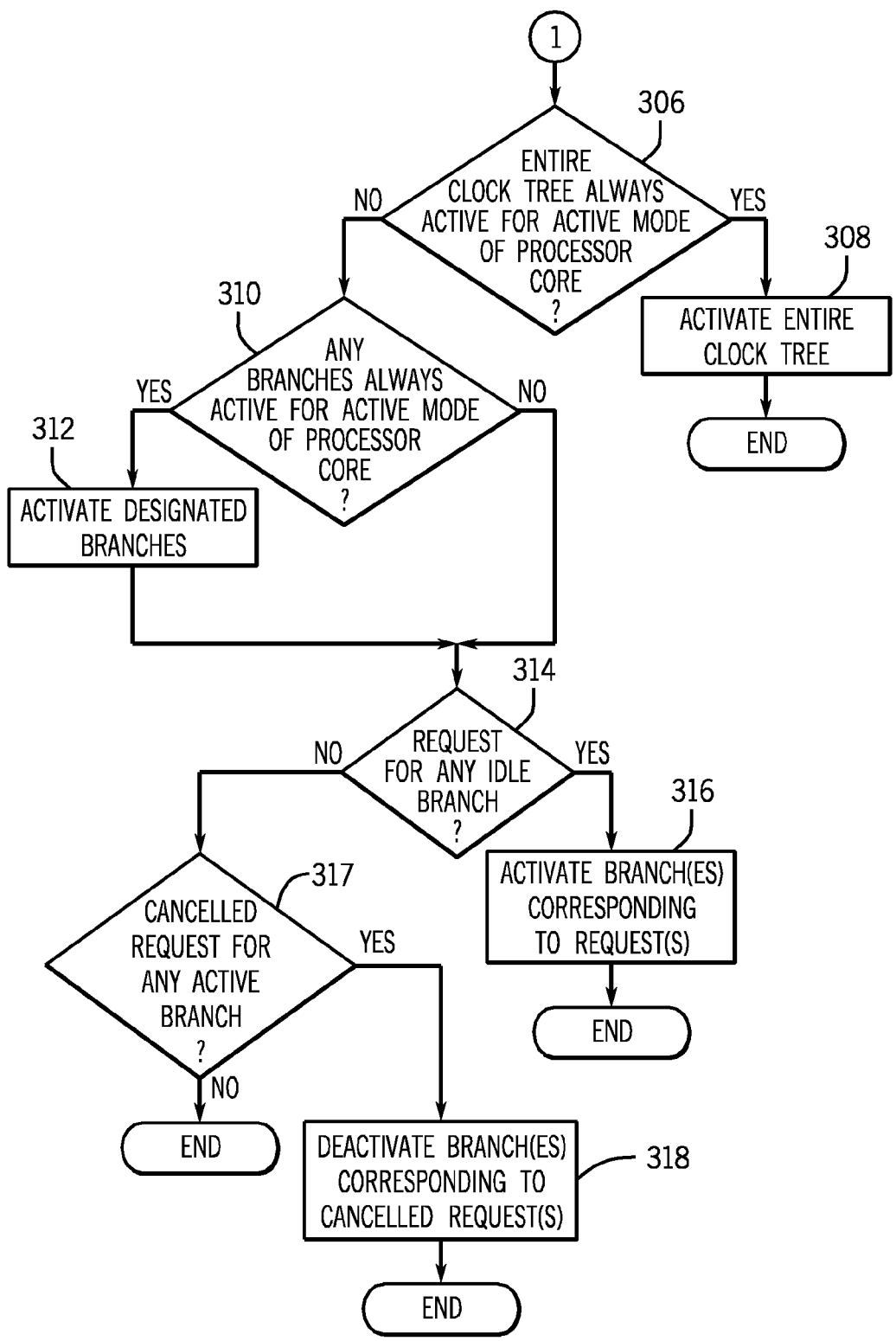
Figure 6:
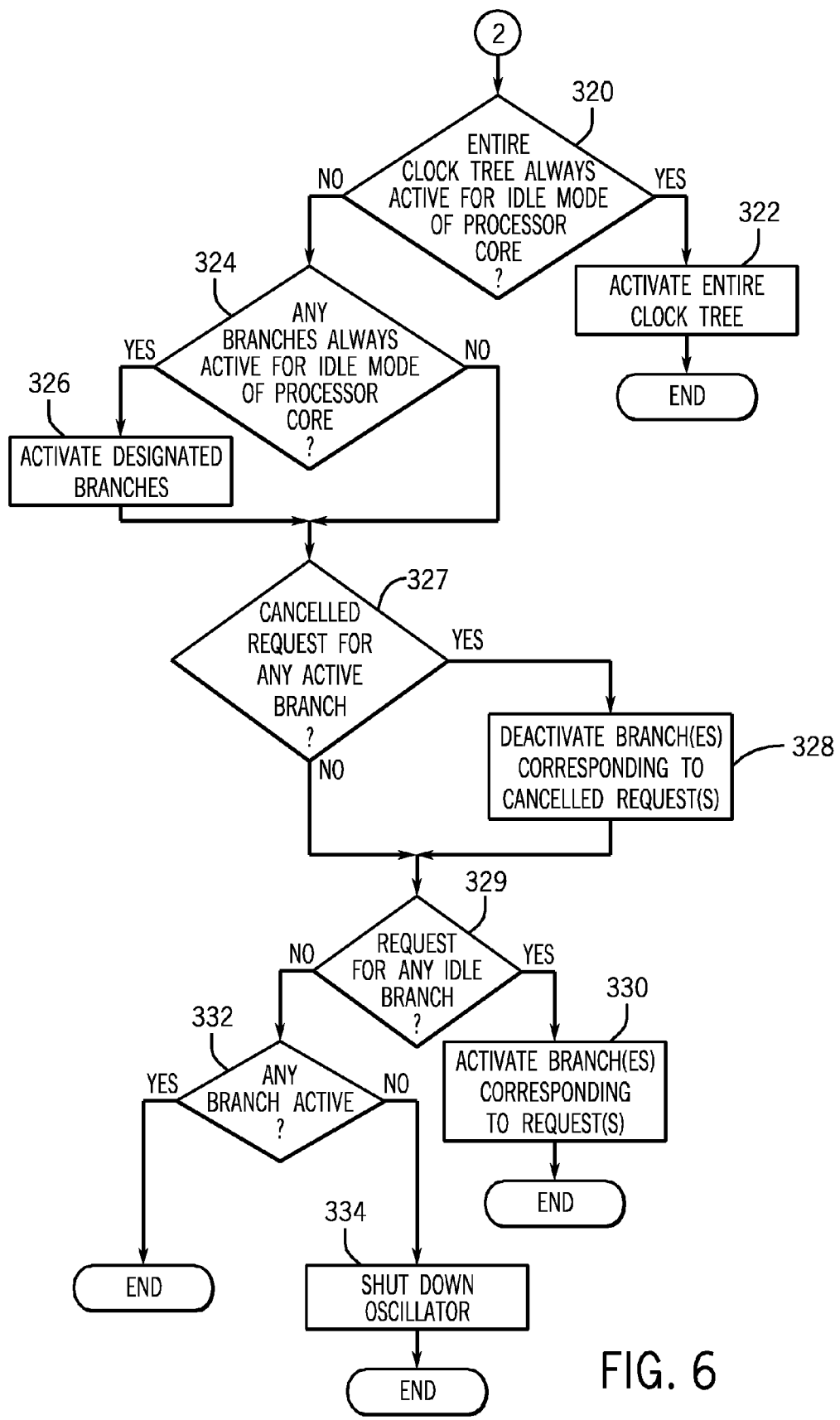

As a more specific non-limiting example, FIGS. 4, 5 and 6 collectively depict a flow diagram of one possible way in which the clock controller 110 selectively activates and deactivates branches of the clock tree for the MCU 24. In this regard, each "branch" of the clock tree corresponds to a particular clock signal and an associated peripheral. A particular branch is "active" when the peripheral receives a clock signal that is provided by the clock controller 110; and correspondingly, the branch is "idle" when the clock controller 110 does not provide the clock signal to the associated peripheral. It is noted that the technique 300 that is depicted in FIGS. 4, 5 and 6 illustrates the overall logic applied by the clock controller 110 and not necessarily any time sequence in which logic is provided. Moreover, the various decision branches in the technique 300 may be configured by corresponding bits of the register(s) 112.

Referring to FIG. 4, pursuant to the technique 300, the clock controller 110 determines (decision block 302) whether the entire clock tree is always active. In this manner, a given bit of the register(s) 112 may control whether the entire clock tree is always active and therefore does not use clock requests for purposes of supplying clock signals to the peripherals. If, however, the entire clock tree is not always active (decision block 302), the technique 300 includes determining (decision block 304) whether the processor core is currently in its active mode. Exemplary logic for the case when the processor core 120 is in the active mode is set forth in connection with FIG. 5.

Referring to FIG. 5, the controller 110 determines (decision block 306) whether the entire clock tree is always active when the processor core 120 is in the active mode. In this regard, a particular bit of the register(s) 112 may control whether the clock controller 110 activates (block 308) the entire clock tree when the processor core 120 is in the active mode, or whether the clock controller 110 selectively regulates communication of the clock signals to the peripherals based on clock requests during the processor core's active mode. If so, the clock controller 110 determines (decision block 310) whether any branches of the clock tree are always active during the active mode of the processor core. In this manner, in accordance with some embodiments, a set of bits of the register(s) 112 may control whether corresponding branches of the clock tree are always active during the active mode of the processor core 120. Each branch may have a corresponding bit in the register(s) 112 so that a given bit state sets the branch as always being active during the active mode of the processor core 120, and correspondingly, the other bit state allows the clock controller 110 to regulate providing the clock signal to the branch, depending on whether the associated peripheral requests a clock signal or not. The clock controller 110 actives (block 312) the designated always active branches for the active mode of the processor core 120, pursuant to block 312.

For the remaining branches of the clock tree, the clock controller 110 selectively regulates whether or not these branches are active or idle, depending on whether the associated peripheral(s) request clock signals. In this regard, the clock controller 110 determines (decision block 314) whether a clock request has been submitted for any idle branch. If so, the clock controller 110 activates the branch(es), which correspond to the request(s), pursuant to block 316. The clock controller 110 also determines (decision block 317) whether there are any cancelled requests for any active branch and if so, deactivates the branch(es) corresponding to the cancelled request(s), pursuant to block 318. It is noted that the clock controller 110 continuously monitors for clock requests and cancelled clock requests for the appropriate branches (i.e., branches that are not always active) and as such, may continually perform blocks 314-318, during the active mode of the processor core.

Referring to FIG. 6, for the idle mode of the processor core, the clock controller 110 determines, based on a particular bit of the register(s) 112, whether the entire clock tree is always active for the idle mode of the processor core, pursuant to decision block 320. If so, the clock controller 110 activates (block 322) the entire clock tree. If, however, the entire clock tree is not always active (decision block 320), the processor core 120 determines (decision block 324) whether any particular branches of the clock tree are always active during the idle mode of the processor core. If so, the clock controller 110 activates (block 326) the designated branches. In this manner, a set of bits of the register(s) 112 may indicate whether or not given branches are to be always active during the idle mode of the processor core 120, or conversely, whether certain branches are to be regulated based on clock requests from the associated peripherals.

For the branches to be regulated based on clock requests and cancelled clock requests, the clock controller 110 proceeds with decision block 327, in which the controller 110 determines whether any clock requests have been cancelled. If so, the clock controller 110 deactivates the appropriate branch(es), which correspond to the cancelled request(s), pursuant to block 328. The clock controller 110 further determines (decision block 329) whether there are any requests for any idle branch of the clock tree, and if so, the clock controller 110 activates (block 330) the branch(es), which correspond to the request(s).

During the idle mode of the processor core 120, the clock controller 110 may be configured (via a corresponding bit of the register(s) 112) whether the clock sources 170 are to be shut down in the case that none of the peripherals are receiving clock signals. Thus, the clock controller 110 determines (decision block 332) whether any branch of the clock tree is active. If not, the clock controller 110 shuts down the clock sources, pursuant to block 334. It is noted that during the idle mode of the processor core, the clock generator 110 generally performs blocks 329-334 for purposes of selectively activating and deactivating branches of the clock tree, depending on clock requests and cancelled clock requests.

Figure 7:
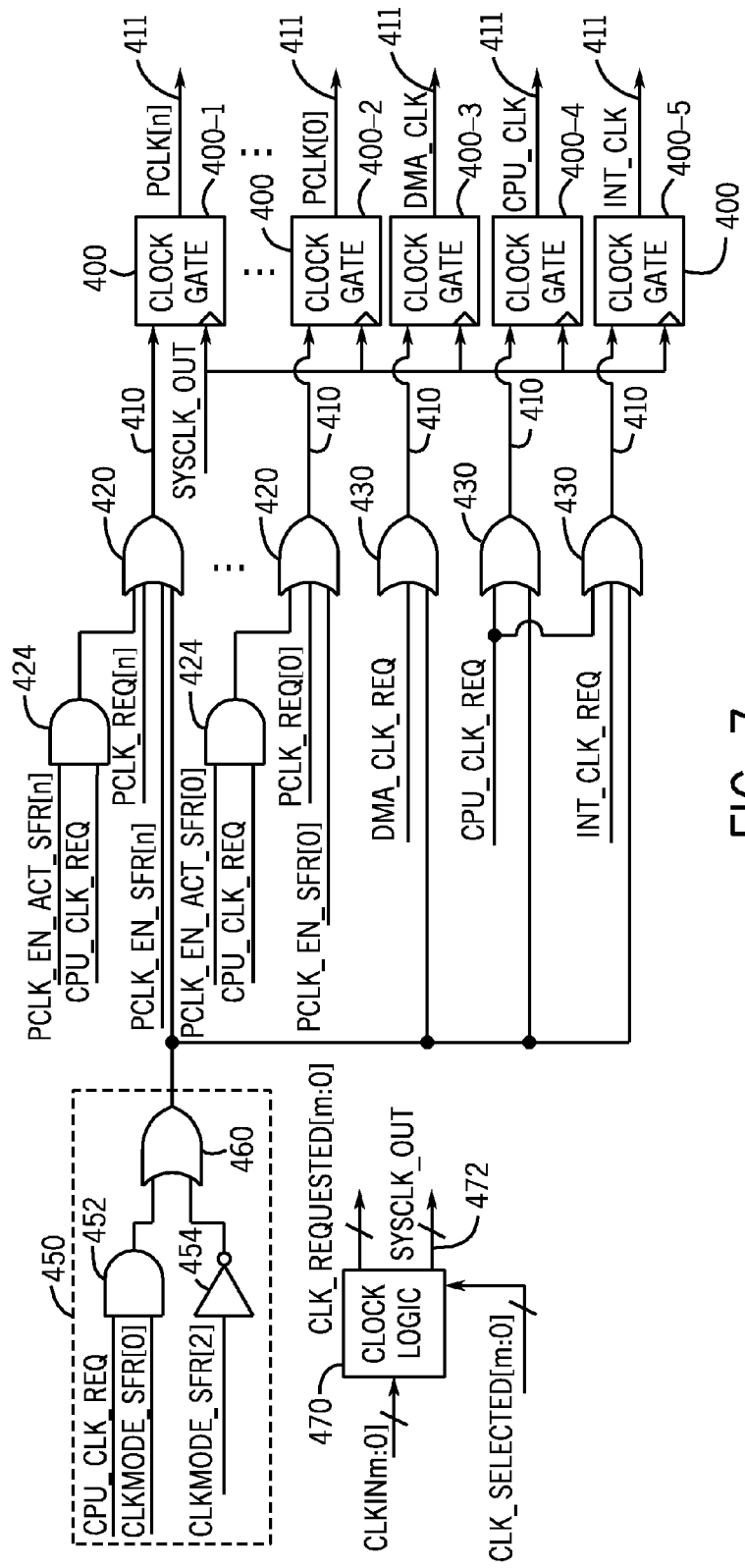
FIG. 7 is a schematic diagram of a circuit of the clock controller of FIG. 2 to control communication of clock signals to peripherals of the microcontroller unit according to an exemplary embodiment.

Referring to FIG. 7, in accordance with some embodiments, the clock controller 110 includes logic for regulating the communication of clock signals to the peripherals of the MCU 24. This logic includes clock gates 400, which are clocked by a system clock signal (called "SYSCLK_OUT"), and each clock gate 400 has a corresponding input terminal 210. In general, each clock gate 400 has an output terminal 411, which provides a signal to the clock input terminal of one of the peripherals. In accordance with some embodiments, when the associated peripheral is to receive a clock signal, the clock gate 400 allows the SYSCLK_OUT clock signal to propagate to the output terminal 411 to provide the clock signal to the associated peripheral. However, when the peripheral is to not receive a clock signal, the clock gate 400 de-asserts (drives to a logic zero value, for example) its output terminal 411. Thus, the signals that are provided by the clock gates 400 are clock signals when the corresponding peripherals and/or processing core 120 are to receive clock signals and de-asserted otherwise. The logical state of the input terminal 410 controls whether the clock gate 400 provides a clock signal at its output terminal 411 or de-asserts the output terminal 411. In accordance with an exemplary embodiment, a clock gate 400 provides the clock signal to the output terminal 411 in response to the input terminal 410 being asserted (driven to a logic one value, for example) and de-asserts the output terminal 411 otherwise (i.e., de-asserts the output terminal 411 in response to the input terminal 410 being driven to a logic zero value, for example).

As a more specific example, in accordance with some embodiments, n clock gates 400 control the communication of clock signals to n respective peripherals 200. In this manner, the clock gates 400 of this group collectively provide a multiple bit PCLK[n:0] signal to a corresponding set of n peripherals 200. As illustrated in FIG. 7 for purposes of example, the clock gate 400-1 provides the PCLK[n] signal, and the clock gate 400-2 provides the PCLK[0] signal.

Other clock gates 400 regulate clock signals for other peripherals of the MCU 24. For example, the clock gate 400-3 provides a DMA_CLK signal to the DMA controller 160 (see FIG. 2); the clock gate 400-4 provides a CPU signal to the processor core 120; and the clock gate 400-5 provides an INT_CLK signal to the interrupt controller 130.

For the clock gates 400, which control the PCLK[n:0] signals for the peripherals 200, the input terminals 410 of these clock gates 400 are controlled by sets of logic, which include an OR gate 420 and an AND gate 424. In general, the OR gate 420 asserts the input terminal 410, which is coupled to the output terminal of the OR gate 420, in response to either the associated peripheral 200 indicating a clock request or in response to an associated bit of an register 112 (see FIG. 2) being set (for this example) to always activate the associated peripheral 200 when the processor core 120 is in the active mode. The output terminal of the AND gate 424 is coupled to an input terminal of the OR gate 420. The AND gate 424 receives two signals, which cause the clock gate 400 to always provide the clock signal to the peripheral 200 in the active mode of the processor core 120, depending on an associated bit of a register 112. As a non-limiting example, for the clock gate 400-2, the OR gate 420 has an input terminal that receives a PCLK_REQ[0], which, when asserted (driven to a logic one state, as a non-limiting example) by the peripheral 200 causes the clock gate 400-2 to provide a clock signal (via the PCLK[0]) to the associated peripheral 200. Another input terminal of the OR gate 420 receives a PCLK_EN_SFR[0], which corresponds to a particular bit of a register 112. For this example, when the PCLK_EN_SFR[0] signal is asserted (driven to a logic one value, for example), the clock gate 400-2 provides the clock signal to the associated peripheral.

For the example that is depicted in FIG. 7, OR gates 430 control the input terminals 410 for the clock gates 400-3, 400-4 and 400-5. Each OR gate 430 receives a clock request signal from the associated peripheral. For example, the OR gate 430 that drives the input terminal 410 for the clock gate 400-3 receives a DMA_CLK request signal, which is asserted by the DMA controller 160 to request a clock signal and de-asserted otherwise. The OR gate 430, which is coupled to the input terminal 410 for the clock gate 400-4 receives a CPU clock request signal, which is asserted to request a clock signal for the processor core 120 and de-asserted otherwise. The OR gate 430 that is coupled to the input terminal 410 for the clock gate 400-5 receives an INT_CLK_REQ signal, which is asserted by the interrupt controller 130 to request a clock signal for the interrupt controller 130 and de-asserted otherwise.

The OR gates 420 and 430 are coupled to logic 450, which is responsive to configuration bits of the register(s) 112 for purposes of globally controlling whether the peripherals receive clock signals. As depicted in FIG. 7, the logic 450 includes an OR gate 460, which has an output terminal that is coupled to an input terminal of each of the OR gates 420 and 430. An input terminal of the OR gate 460 is coupled to the output terminal of an inverter 454, which has an input terminal that receives a CLK_MODE_SFR[2] signal. The CLK_MODE_SFR[2] signal is provided by a particular bit of the register(s) 112.

When asserted (e.g., when the bit has a logic one value), the CLK_MODE_SFR[2] signal enables the low power idle mode. In other words, its assertion allows the multi-bit PCLK_EN_SFR[n:0] signal (derived from the register(s) 112) to be applied during the idle state of the processor core 120. Another input terminal of the OR gate 460 is coupled to the output terminal of an AND gate 452. The output terminal of the AND gate 452 controls whether the entire clock tree is active during the idle state of the processor core 130. More specifically, in accordance with example embodiments, one terminal of the AND gate 452 receives a CPU clock request signal, which when asserted (driven to a logic one value, for example) indicates that the processor core 120 is in its active mode and when de-asserted indicates that the processor core 120 is in its idle mode.

Another input terminal of the AND gate 452 receives a CLK_MODE_SFR[0] signal, which corresponds to a bit of a register 112. When the CLK_MODE_SFR[0] signal is asserted (driven to a logic one value, for example), this forces the entire clock tree to be in an active mode. Otherwise, when the CLK_MODE_SFR[0] signal is de-asserted, the peripherals may control their own clock requests. Thus, the output terminal of the AND gate 452 is asserted when all peripherals are to receive clock signals during the active mode of the processor core 120 and de-asserted otherwise.

The clock controller 110 also includes clock logic 470, which furnishes a multiple bit CLK_REQUESTED[m:0] signal for purposes of requesting one or more clock signals from the clock sources 170 (see FIG. 2). In this manner, in response to the CLK_REQUESTED[m:0] signal, the clock sources 470 provide the requested clocks in a multiple bit CLKIN[m:0] signal. Moreover, the clock logic 470 provides the SYSCLK_OUT signal on an output terminal 470, which is received by the clock gates 400. For purposes of selecting the clock sources that are indicated by the CLK_REQUESTED[m:0] signal, the clock logic 470 receives a CLK_SELECTED[m:0] multiple bit signal, which is set, according to some embodiments, by corresponding bits a register 112. In general, the clock sources 170 disable a particular clock source if the corresponding bit of the CLK_REQUESTED[m:0] signal is de-asserted (driven to a logic zero value, for example) and correspondingly enables the clock source when the bit is asserted (driven to a logic one value, for example).

Figure 8:
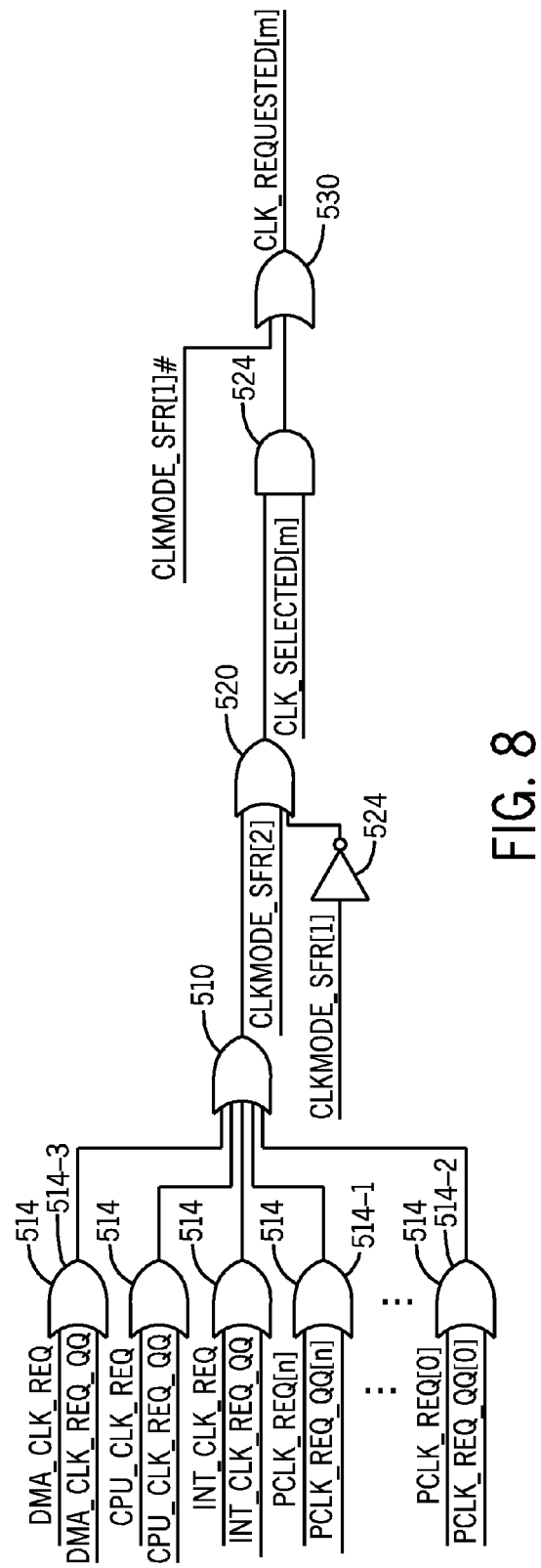
FIG. 8 is a schematic diagram of a circuit of the clock controller of FIG. 2 to select a source clock signal provided to the clock controller according to an exemplary embodiment.

FIG. 8 depicts an exemplary schematic diagram for a portion of the clock logic 470, in accordance with some embodiments. In particular, the circuitry of FIG. 8 illustrates the generation of a particular bit of the CLK_REQUESTED[m:0] signal, in accordance with some embodiments. For this example, FIG. 8 illustrates the generation of the CLK_REQUESTED[m] signal. Thus, the circuitry depicted in FIG. 8 may be replicated for other bits of the CLK_REQUESTED[m:0] signal, in accordance with some embodiments.

For the specific example depicted in FIG. 8, an OR gate 530 provides the CLK_SELECTED[m] signal. An input terminal of the OR gate 530 receives an inverted CLK_MODE_SFR[1] signal, which corresponds to a bit of a register 112. When the CLK_MODE_SFR[1] is asserted, the CLK_MODE_SFR[1] signal has no bearing on the CLK_SELECTED[m] signal, and as a result, the corresponding clock source 170 is always enabled regardless of whether none of the peripherals are requesting clock signals. If, however, the CLK_MODE_SFR[1] signal asserted, then the state of the CLK_REQUESTED[m] depends on whether any of the peripherals are requesting clock signals.

In this manner, another input terminal of the OR gate 530 is coupled to the output terminal of an AND gate 524. An input terminal of the AND gate 524 receives the CLK_SELECTED[m] signal. If the clock source 170 is not selected (as indicated by the CLK_SELECTED[m] signal), then the CLK_REQUESTED[m] signal is de-asserted. Another input terminal of the AND gate 524 is coupled to the output terminal of an OR gate 520. An input terminal of the OR gate 520 receives the inverted CLK_MODE_SFR[1] signal (inverted by an inverter 524). When the CLK_MODE_SFR[1] signal, which corresponds to a register 112 bit is de-asserted, the CLK_REQUESTED[m] signal is always asserted, as the corresponding clock source 170 is always asserted. Another input terminal of the OR gate 520 receives the CLK_MODE_SFR[2] signal, which, when asserted, enables the low power idle mode and as such, causes the assertion of the CLK_REQUESTED[m] signal. Another input terminal of the OR gate 520 is coupled to the output terminal of an OR gate 510 for purposes of causing the CLK_REQUESTED[m] signal to be de-asserted if all of the peripheral clock request lines are de-asserted.

In this manner, input terminals of the OR gate 510 are coupled to corresponding output terminals of OR gates 514. Each OR gate 514, in turn, receives signals associated with clock requests from a particular peripheral. For example, OR gate 514-1 receives the PCLK_REQ[n] signal from a corresponding peripheral 200 and a clocked version of the PCLK_REQ[n] signal, called, "PCLK_REQ_QQ[n]." If both of these signals are de-asserted (driven to logic zero values, for example), then the output terminal of the OR gate 514-1 is also de-asserted. Otherwise, the output terminal of the OR gate 514-1 is asserted (driven to a logic one state, for example). Likewise, the other OR gates 514 generate signals to indicate whether their associated peripherals have asserted clock requests. Thus, the OR gate 514-2 receives signals derived from the PCLK_REQ[0] signal; the OR gate 514-3 receives signals derived from the DMA_CLK_REQ signal; and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   using a processor to communicate with a peripheral;
   using the peripheral to request a clock signal; and
   selectively granting the request and communicating the clock signal to the peripheral based at least in part on a power state of the processor.

2. The method of claim 1, further comprising responding to the request in response to the processor being in a first power state associated with a lower power consumption than a second power state of the processor in which the processor communicates with the peripheral.

3. The method of claim 1, further comprising responding to the request regardless of whether the processor is in a first power state associated with a lower power consumption or a second power state associated with a higher power consumption than the first power state.

4. The method of claim 1, wherein the using comprises using asynchronous circuitry of the peripheral to request the clock signal.

5. The method of claim 1, further comprising providing a clock signal to the processor in response to the request.

6. The method of claim 5, further comprising using the peripheral to alert the processor to transition the processor from a first power state to a second power state associated with a greater power consumption than a power consumption associated with the first power state.

7. The method of claim 1, further comprising using another peripheral to request a clock signal in response to the request.

8. An apparatus comprising:
a processor;
a peripheral to communicate with the processor, the peripheral adapted to request a clock signal; and
a controller to selectively grant the request and communicate the clock signal to the peripheral based at least in part on a power state of the processor.

9. The apparatus of claim 8, wherein the controller is adapted to respond to the request in response to the processor being in a first power state associated with a lower power consumption than a second power state of the processor in which the processor communicates with the peripheral.

10. The apparatus of claim 8, wherein the controller responds to the request without using the processor.

11. The apparatus of claim 8, wherein the peripheral comprises an asynchronous circuit to request the clock signal.

12. The apparatus of claim 8, wherein the controller is adapted to provide another clock signal to the processor in response to the request.

13. The apparatus of claim 8, wherein the peripheral is adapted to alert the processor to cause the processor to transition from a first power state to a second power state, the second power state being associated with a power consumption greater than a power consumption associated with the first power state.

14. The apparatus of claim 8, further comprising:
another peripheral to request a clock signal in response to the request.

15. An apparatus comprising:
an integrated circuit comprising a processor, a peripheral to communicate with the processor, and a controller,
wherein the peripheral is adapted to request a clock signal and the controller is adapted to selectively grant the request and communicate the clock signal to the peripheral based at least in part on a power state of the processor.

16. The apparatus of claim 15, wherein the controller is adapted to respond to the request in response to the processor being in a first power state associated with a lower power consumption than a second power state of the processor in which the processor communicates with the peripheral.

17. The apparatus of claim 15, wherein the controller responds to the request without using the processor.

18. The apparatus of claim 15, wherein the peripheral comprises an asynchronous circuit to request the clock signal.

19. The apparatus of claim 15, wherein the controller is adapted to provide another clock signal to the processor in response to the request.

20. The apparatus of claim 15, wherein the peripheral is adapted to alert the processor to cause the processor to transition from a first power state to a second power state, the second power state being associated with a power consumption greater than a power consumption associated with the first power state.

* * * * *